Patented Dec. 29, 1936

2,065,863

UNITED STATES PATENT OFFICE 2,065,863

METHOD OF PRESERVING VEGETABLE MATTER

Gerhard Madaus, Dresden, Germany, assignor to Dr. Madaus & Co., Radebeul-Dresden, Germany No Drawing. Application December 17, 1935, Serial No. 54,953. In Germany December 24, 1934

2 Claims. (Cl. 99—100)

This invention relates to new and useful vegetable products and to the method of making the same.

The primary object of the present invention is to provide a dry ground vegetable product which shall be exceedingly stable and free from fermentation and hydrolysis, and to provide a novel method of making the same.

Another object is to provide a method and product of the aforesaid character wherein the vegetable matter is ground in the presence of another substance, such as lactose, which substance permits the vegetable matter to be ground to a very fine state having substantially colloidal dimensions.

A further object is to provide a product and a method of making the same wherein the vegetable matter is ground in the presence of lactose so that the volatile products, that are liberated when the cell structures of the vegetables are ruptured, are preserved and absorbed either chemically or physically, or both, by the lactose.

The foregoing, and other objects and advantages will be more fully described hereinafter and will be pointed out in the appended claims.

In practicing the present invention, plants or vegetable matter, preferably fresh, are ground in any suitable apparatus in the presence of lactose or milk sugar. The fresh vegetable matter may be mixed with lactose in any suitable proportions, but I have found that substantially equal parts of lactose and vegetable matter produce a satisfactory product.

By grinding the vegetable matter in the presence of lactose, I find that no fermentation or hydrolysis is produced either during the grinding or in the finished product, and hence the finished product is exceedingly stable and is not subject to deterioration. Also, due to the presence of the lactose during grinding of the vegetable matter, I find that the resultant product may be ground much smaller in size than when the vegetable matter is ground by itself. If desired, the product may be reduced in size to colloidal dimensions when ground in the presence of lactose. Another advantage of grinding in the presence of lactose, rather than first grinding and then mixing with lactose, is that during the grinding operation, certain volatile constituents are liberated from the cell structures of the vegetable matter and I find that when lactose is present, these volatile constituents are retained either due to chemical or physical action, or a combination of both, with the lactose. If the vegetable matter is ground by itself and then mixed with lactose, I find that these volatile constituents are lost as they escape before the ground vegetable material can be mixed with the lactose. It is of primary importance therefore, that the vegetable matter be ground in the presence of lactose so that such volatile constituents will be retained in the final product.

After the grinding operation, the product is then dried, preferably by exposing the same to a current of warm air. The product being of a very finely divided character, I preferably first expose it to a current of warm air of a temperature not higher than 30° C., and having a moisture content sufficient to prevent crusting of the product. As the drying progresses, the moisture content of the warm air can be decreased to permit more rapid drying of the product and this drying is continued until the finished product contains less than 2% of moisture.

If it is desired to increase the stabilization of the volatile constituents of the vegetable matter in the finished product, this can be accomplished by mixing with the vegetable matter, either before or during grinding, various non-crystallizing sugars or sugar mixtures, such as for instance dextro mannose, dextro fructose, and similar sugars. Particularly suitable for this purpose are grape sugar and invert sugar, as well as mixtures of crystallizing sugars and non-crystallizing sugars which have been rendered non-crystallizing. An example of the latter is a mixture of cane sugar and starch sugar.

I claim:

1. The method of preparing a stable ground product from fresh plants which consists in grinding fresh plants in the presence of lactose to a finely divided state, and then drying the product by an air current having a temperature not higher than 30° C., to gradually reduce the moisture content of the resulting product.

2. The method of preparing a stable ground product from fresh plants which consists in grinding fresh plants in the presence of lactose to a finely divided state, then drying the product by an air current having a temperature not higher than 30° C., and gradually reducing the moisture content of said air current as drying progresses.

GERHARD MADAUS.